United States Patent
Quach et al.

(10) Patent No.: US 12,443,867 B2
(45) Date of Patent: *Oct. 14, 2025

(54) ENVIRONMENTAL CONDITION-BASED RISK LEVEL

(71) Applicant: Lytx, Inc., San Diego, CA (US)

(72) Inventors: Quoc Chan Quach, San Diego, CA (US); Gabriela Surpi, San Diego, CA (US)

(73) Assignee: Lytx, Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/137,940

(22) Filed: Apr. 21, 2023

(65) Prior Publication Data

US 2023/0385665 A1  Nov. 30, 2023

Related U.S. Application Data

(63) Continuation of application No. 14/970,257, filed on Dec. 15, 2015, now Pat. No. 11,663,508.

(51) Int. Cl.
*G06N 7/01* (2023.01)
*G06F 9/54* (2006.01)

(52) U.S. Cl.
CPC ............. *G06N 7/01* (2023.01); *G06F 9/542* (2013.01)

(58) Field of Classification Search
None
See application file for complete search history.

(56) References Cited

U.S. PATENT DOCUMENTS

| | | |
|---|---|---|
| 9,587,952 B1 | 3/2017 | Slusar |
| 2010/0106413 A1 | 4/2010 | Mudalige |
| 2010/0188201 A1 | 7/2010 | Cook |
| 2012/0078944 A1 | 3/2012 | Lloyd |
| 2013/0244210 A1 | 9/2013 | Nath |
| 2015/0211868 A1 | 7/2015 | Matsushita |
| 2015/0375756 A1 | 12/2015 | Do |
| 2016/0288627 A1 | 10/2016 | Trinh |
| 2016/0373473 A1 | 12/2016 | Truong |
| 2017/0113665 A1 | 4/2017 | Mudalige |

OTHER PUBLICATIONS

Turner, S. et al., "Intersection accident estimation: the role of intersection location and non-collision flows," Accident Analysis and Prevention, vol. 30, No. 4 (1998) pp. 505-517. (Year: 1998).*
Carter et al., "Bicyclist intersection safety index," Transportation Research Record: Journal of the Transportation Research Board, No. 2031 (2007) pp. 18-24. (Year: 2007).
Liu et al., "Robust dazzling detection in a novel visual based dazzling avoidance system," 2014 IEEE Intelligent Vehicles Symposium (Jun. 8-11, 2014) pp. 833-838. (Year: 2014).

(Continued)

*Primary Examiner* — Brian M Smith
(74) *Attorney, Agent, or Firm* — Van Pelt, Yi & James LLP

(57) ABSTRACT

A system for determining risky events includes an input interface and a processor. The input interface is for receiving sensor data on environmental conditions. The processor is for determining whether the environmental conditions indicate an increase in event probability and, in the event that environmental conditions indicate the increase in the event probability, adjusting an event detection threshold.

19 Claims, 9 Drawing Sheets

(56) References Cited

OTHER PUBLICATIONS

Oh et al., "Development of accident prediction models for rural highway intersections," Transportation Research Record: Journal of the Transportation Research Board, No. 1897 (2004) pp. 18-27. (Year: 2004).

Zeeger et al., "Index for assessing pedestrian safety at intersections," Transportation Research Record: Journal of the Transportation Research Board, No. 1982 (2006) pp. 76-83. (Year: 2006).

* cited by examiner

ENVIRONMENTAL CONDITION-BASED RISK LEVEL

CROSS REFERENCE TO OTHER APPLICATIONS

This application is a continuation of U.S. patent application Ser. No. 14/970,257 entitled ENVIRONMENTAL CONDITION-BASED RISK LEVEL filed Dec. 15, 2015 which is incorporated herein by reference for all purposes.

BACKGROUND OF THE INVENTION

Modern vehicles (e.g., airplanes, boats, trains, cars, trucks, etc.) can include a vehicle event recorder in order to better understand the timeline of an anomalous event (e.g., an accident). A vehicle event recorder typically includes a set of sensors, e.g., video recorders, audio recorders, accelerometers, gyroscopes, vehicle state sensors, GPS (global positioning system), etc., that report data, which is used to determine the occurrence of an anomalous event. Sensor data can then be transmitted to an external reviewing system. Anomalous event types include accident anomalous events, maneuver anomalous events, location anomalous events, proximity anomalous events, vehicle malfunction anomalous events, driver behavior anomalous events, or any other anomalous event types. In some cases, environmental conditions pose a problem and contribute to the risk of an anomalous event.

BRIEF DESCRIPTION OF THE DRAWINGS

Various embodiments of the invention are disclosed in the following detailed description and the accompanying drawings.

DETAILED DESCRIPTION

Figure 1:
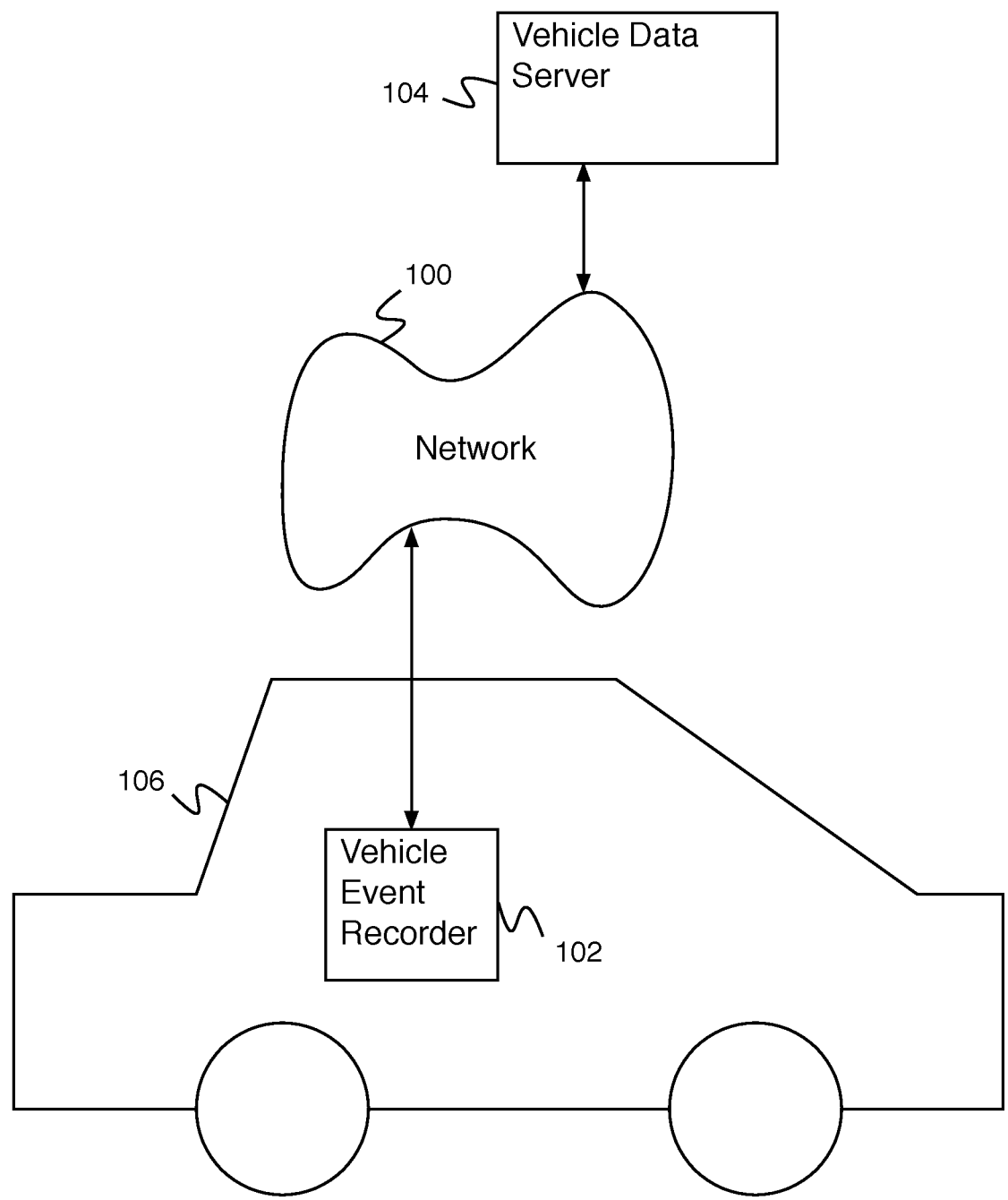
FIG. 1 is a block diagram illustrating an embodiment of a system including a vehicle event recorder.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for determining risky events comprises an input interface for receiving sensor data on environmental conditions and a processor for determining whether the environmental conditions indicate an increase in event probability, and in the event that environmental conditions indicate the increase in the event probability, adjusting an event detection threshold. In some embodiments, the processor is coupled to a memory and the memory is configured to provide the processor with instructions.

In some embodiments, a system for determining risky events comprises a vehicle event recorder comprising a processor and a memory. The vehicle event recorder is coupled to a set of sensors (e.g., audio sensors, video sensors, accelerometers, gyroscopes, global positioning system sensors, vehicle state sensors, etc.) for recording vehicle data. The vehicle event recorder determines environmental conditions from the sensor data and determines whether the environmental conditions indicate an increase in event probability. In some embodiments, the vehicle event recorder determines whether the environment is distracting to the driver or otherwise presents an unusual challenge to the driver (e.g., if the driver is approaching an intersection of unusual complexity, if there is glare in the driver's eyes, if there are unusual noises occurring around the vehicle, etc.). In the event the environment is determined to be distracting to the driver, an event detection threshold is adjusted. In some embodiments, an event detection threshold comprises a limit which, when crossed by a sensor data event measure (e.g., a measure derived from sensor data), indicates the occurrence of an anomalous event. In some embodiments, in the event the environment is determined to be distracting to the driver, the event detection threshold is adjusted to detect events more readily.

FIG. 1 is a block diagram illustrating an embodiment of a system including a vehicle event recorder. Vehicle event recorder 102 comprises a vehicle event recorder mounted in a vehicle (e.g., a car or truck). In some embodiments, vehicle event recorder 102 includes or is in communication with a set of sensors—for example, video recorders, audio recorders, accelerometers, gyroscopes, vehicle state sensors, proximity sensors, a global positioning system (e.g., GPS), outdoor temperature sensors, moisture sensors, laser line tracker sensors, or any other appropriate sensors. In various embodiments, vehicle state sensors comprise a speedometer, an accelerator pedal sensor, a brake pedal sensor, an engine revolutions per minute (e.g., RPM) sensor, an engine temperature sensor, a headlight sensor, an airbag deployment sensor, driver and passenger seat weight sensors, an anti-locking brake sensor, an engine exhaust sensor, a gear position sensor, a cabin equipment operation sensor, or any other appropriate vehicle state sensors. In some embodiments, vehicle event recorder 102 comprises a system for processing sensor data and detecting events. In some embodiments, vehicle event recorder 102 comprises map data. In some embodiments, vehicle event recorder 102 comprises a system for detecting risky behavior. In various embodiments, vehicle event recorder 102 is mounted on vehicle 106 in one of the following locations: the chassis, the front grill, the dashboard, the rear-view mirror, or any other appropriate location. In some embodiments, vehicle event recorder 102 comprises multiple units mounted in different locations in vehicle 106. In some embodiments, vehicle event recorder 102 comprises a communications system for communicating with network 100. In various embodiments, network 100 comprises a wireless network, a wired network, a cellular network, a Code Division Multiple Access (CDMA) network, a Global System for Mobile Communication (GSM) network, a Long-Term Evolution (LTE) network, a Universal Mobile Telecommunications System (UMTS) network, a Worldwide Interoperability for Microwave Access (WiMAX) network, a Dedicated Short-Range Communications (DSRC) network, a local area network, a wide area network, the Internet, or any other appropriate network. In some embodiments, network 100 comprises multiple networks, changing over time and location. In some embodiments, different networks comprising network 100 comprise different bandwidth cost (e.g., a wired network has a very low cost, a wireless Ethernet connection has a moderate cost, a cellular data network has a high cost). In some embodiments, network 100 has a different cost at different times (e.g., a higher cost during the day and a lower cost at night). Vehicle event recorder 102 communicates with vehicle data server 104 via network 100. Vehicle event recorder 102 is mounted to vehicle 106. In various embodiments, vehicle 106 comprises a car, a truck, a commercial vehicle, or any other appropriate vehicle. Vehicle data server 104 comprises a vehicle data server for collecting events and risky behavior detected by vehicle event recorder 102. In some embodiments, vehicle data server 104 comprises a system for collecting data from multiple vehicle event recorders. In some embodiments, vehicle data server 104 comprises a system for analyzing vehicle event recorder data. In some embodiments, vehicle data server 104 comprises a system for displaying vehicle event recorder data. In some embodiments, vehicle data server 104 is located at a home station (e.g., a shipping company office, a taxi dispatcher, a truck depot, etc.). In various embodiments, vehicle data server 104 is located at a colocation center (e.g., a center where equipment, space, and bandwidth are available for rental), at a cloud service provider, or any at other appropriate location. In some embodiments, events recorded by vehicle event recorder 102 are downloaded to vehicle data server 104 when vehicle 106 arrives at the home station. In some embodiments, vehicle data server 104 is located at a remote location. In some embodiments, events recorded by vehicle event recorder 102 are downloaded to vehicle data server 104 wirelessly. In some embodiments, a subset of events recorded by vehicle event recorder 102 is downloaded to vehicle data server 104 wirelessly. In some embodiments, vehicle event recorder 102 comprises a system for determining risky events.

Figure 2:
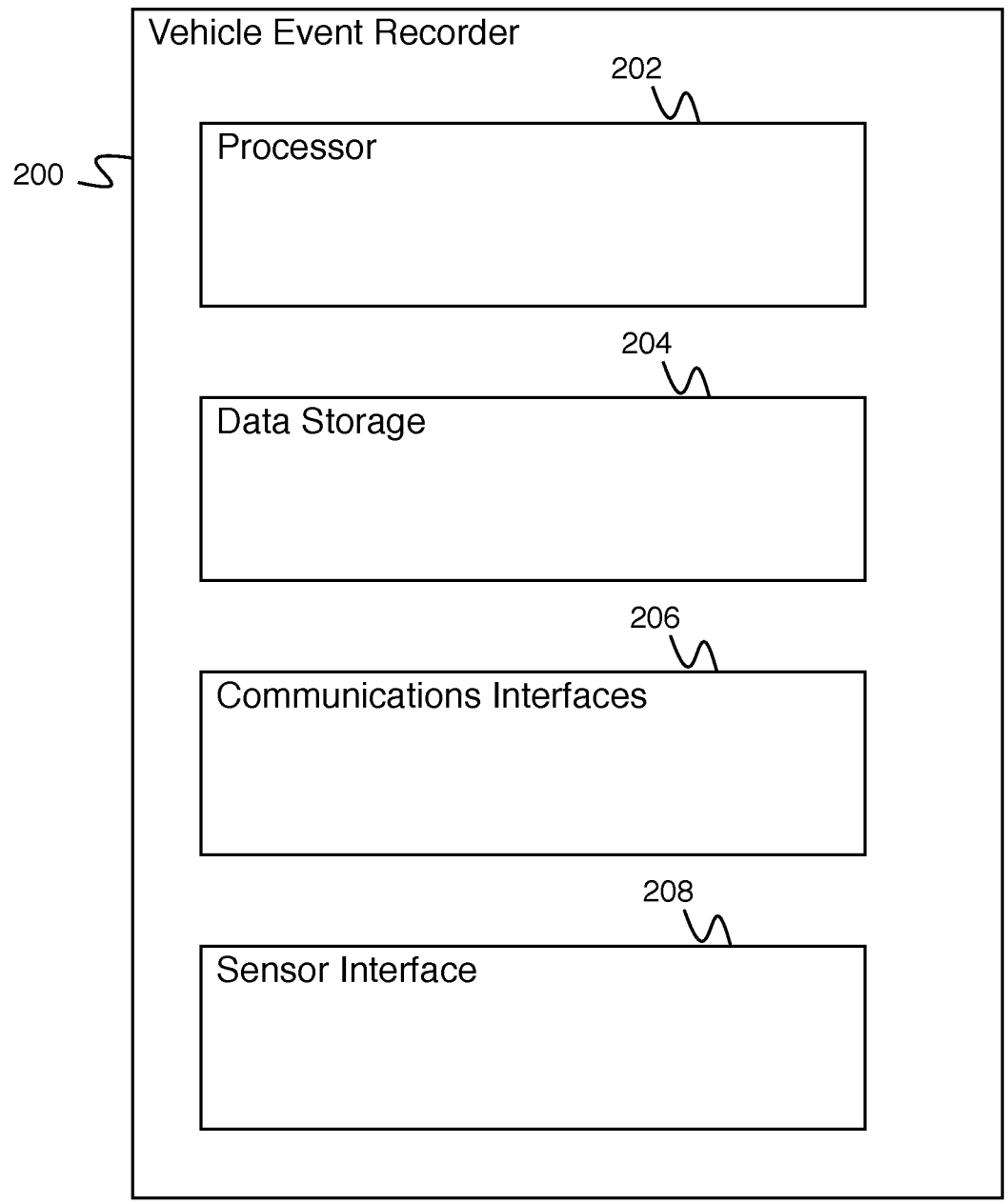
FIG. 2 is a block diagram illustrating an embodiment of a vehicle event recorder.

FIG. 2 is a block diagram illustrating an embodiment of a vehicle event recorder. In some embodiments, vehicle event recorder 200 of FIG. 2 comprises vehicle event recorder 102 of FIG. 1. In the example shown, vehicle event recorder 200 comprises processor 202. Processor 202 comprises a processor for controlling the operations of vehicle event recorder 200, for reading and writing information on data storage 204, for communicating via wireless communications interface 206, and for reading data via sensor interface 208. In various embodiments, processor 202 comprises a processor for determining a vehicle characterization, determining a vehicle identifier, determining a maintenance item, or for any other appropriate purpose. Data storage 204 comprises a data storage (e.g., a random access memory (RAM), a read only memory (ROM), a nonvolatile memory, a flash memory, a hard disk, or any other appropriate data storage). In various embodiments, data storage 204 comprises a data storage for storing instructions for processor 202, vehicle event recorder data, vehicle event data, sensor data, video data, driver scores, or any other appropriate data. In various embodiments, communications interfaces 206 comprises one or more of a GSM interface, a CDMA interface, a LTE interface, a WiFi™ interface, an Ethernet interface, a Universal Serial Bus (USB) interface, a Bluetooth™ interface, an Internet interface, or any other appropriate interface. Sensor interface 208 comprises an interface to one or more vehicle event recorder sensors. In various embodiments, vehicle event recorder sensors comprise an exterior video camera, an exterior still camera, an interior video camera, an interior still camera, a microphone, an accelerometer, a gyroscope, an outdoor temperature sensor, a moisture sensor, a laser line tracker sensor, vehicle state sensors, or any other appropriate sensors. In some embodiments, compliance data is received via sensor interface 208. In some embodiments, compliance data is received via communications interface 206. In various embodiments, vehicle state sensors comprise a speedometer, an accelerator pedal sensor, a brake pedal sensor, an engine revolutions per minute (RPM) sensor, an engine temperature sensor, a headlight sensor, an airbag deployment sensor, driver and passenger seat weight sensors, an anti-locking brake sensor, an engine exhaust sensor, a gear position sensor, a turn signal sensor, a cabin equipment operation sensor, or any other appropriate vehicle state sensors. In some embodiments, sensor interface 208 comprises an on-board diagnostics (OBD) bus (e.g., society of automotive engineers (SAE) J1939, J1708/J1587, OBD-II, CAN BUS, etc.). In some embodiments, vehicle event recorder 200 communicates with vehicle state sensors via the OBD bus.

Figure 3:
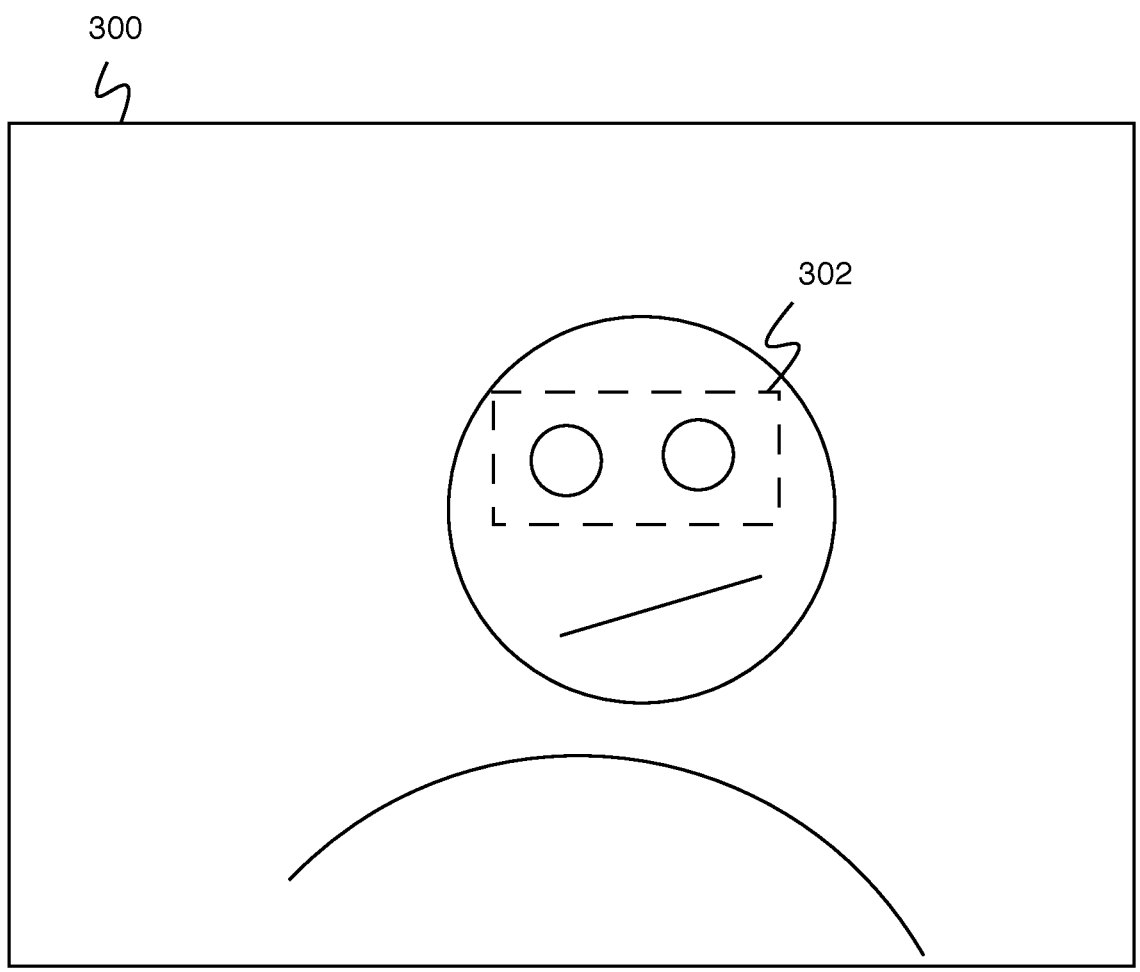
FIG. 3 is a diagram illustrating an embodiment of an image of a driver.

FIG. 3 is a diagram illustrating an embodiment of an image of a driver. In some embodiments, image 300 comprises an image from an internal video recorder (e.g., a video recorder mounted inside a vehicle cab and pointed at the driver). In some embodiments, images from an internal video recorder are processed by a vehicle event recorder to determine whether environmental conditions indicate an increase in event probability. In the example shown, image 300 is processed to determine whether there is excessive light in the eyes of the driver. The processor determines border 302 separating a region comprising the driver's eyes from a region not comprising the driver's eyes. A driver's eyes light level is determined to be the average light level within border 302 (e.g., the average light level in the area of the driver's eyes). An ambient light level is determined to be the average light level in the image outside of border 302 (e.g., the average light level everywhere but the driver's eyes. In some embodiments, it is determined that the environmental conditions indicate excessive light in the driver's eyes (e.g., increased likelihood of an anomalous event) based at least in part on the driver's eyes light level and the ambient light level. In various embodiments, it is determined that the environmental conditions indicate excessive light in the driver's eyes in the event the ratio of the driver's eyes light level to the ambient light level is above a threshold ratio, it is determined that the environmental conditions indicate excessive light in the driver's eyes in the event the driver's eyes light level is more than a threshold greater than the ambient light level, it is determined that the environmental conditions indicate excessive light in the driver's eyes in the event that the driver's eyes light level is above a threshold and the ambient light level is below a threshold, or it is determined that the environmental conditions indicate excessive light in the driver's eyes for any other appropriate reason.

Figure 4:
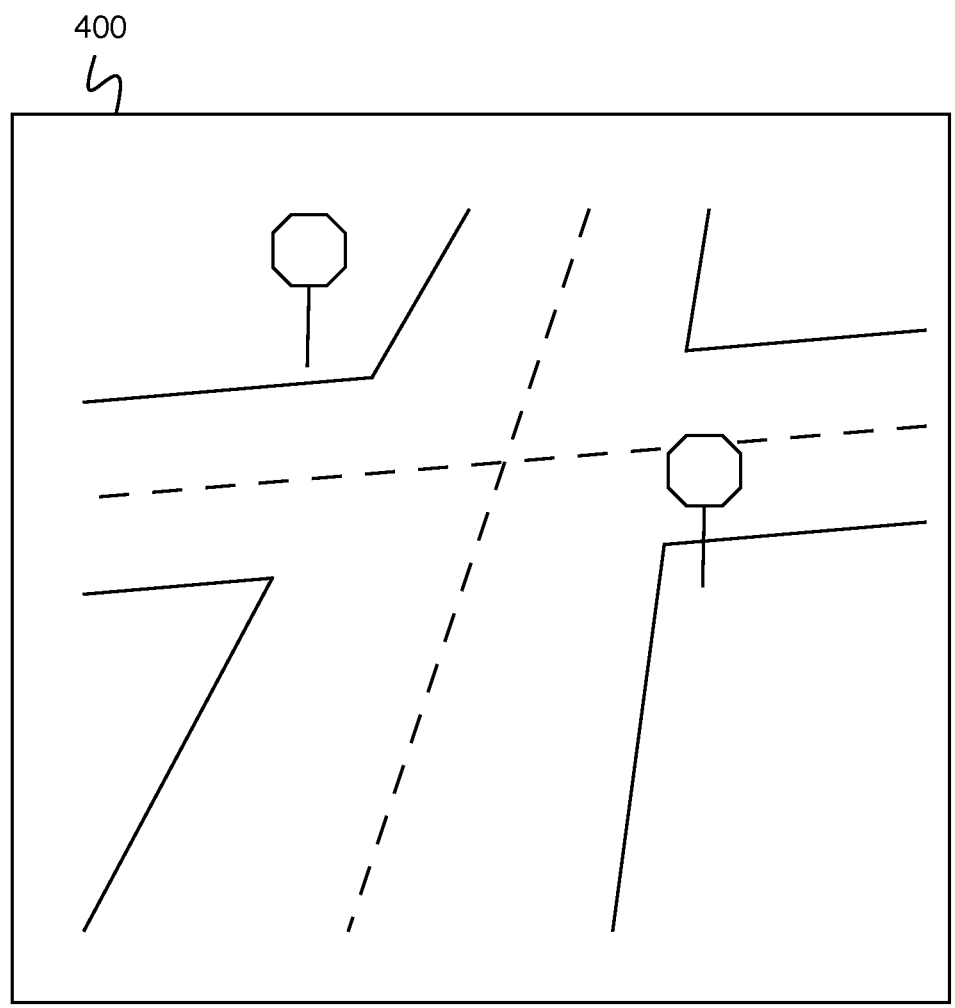
FIG. 4 is a diagram illustrating an embodiment of an image of an intersection.

FIG. 4 is a diagram illustrating an embodiment of an image of an intersection. In some embodiments, image 400 comprises an image from an external video recorder (e.g., a video recorder mounted outside a vehicle cab and pointed at the road). In some embodiments, images from an external video recorder are processed by a vehicle event recorder to determine whether environmental conditions indicate an increase in event probability. In the example shown, image 400 is processed to determine whether the intersection comprises a complex intersection. In various embodiments, determining whether the intersection comprises a complex intersection comprises determining a road configuration, determining a number of roads present, determining a number of lanes present, determining a number of directions of traffic, determining signs, determining lights, determining pedestrian crosswalks, determining bicycle lanes, determining rail tracks, or determining any other appropriate intersection feature. In some embodiments, determining whether the intersection comprises a complex intersection comprises determining which type of a predetermined set of intersection types the intersection matches. In some embodiments, the risk level of the intersection is determined to be an average risk level of other intersections determined to be of the same type. In some embodiments, sensor data (e.g., GPS data) is used in conjunction with image data to determine whether the intersection comprises a complex intersection. In some embodiments, GPS data is used to determine whether the intersection risk level has already been determined and stored (e.g., stored in a catalog of intersection GPS information and associated intersection risk level).

Figure 5:
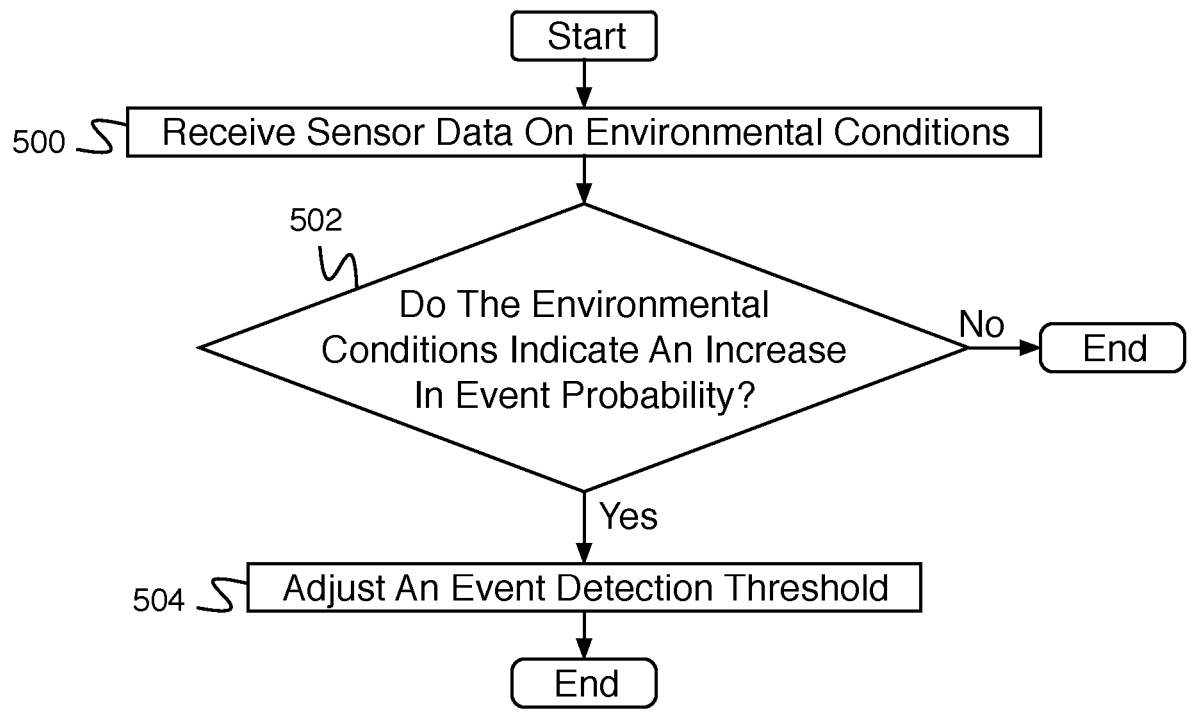
FIG. 5 is a flow diagram illustrating an embodiment of a process for determining risky events.

FIG. 5 is a flow diagram illustrating an embodiment of a process for determining risky events. In some embodiments, the process of FIG. 5 is executed by a vehicle event recorder (e.g., vehicle event recorder 102 of FIG. 1). In the example shown, in 500, sensor data on environmental conditions is received. In various embodiments, sensor data comprises image data, still image data, video data, audio sensor data, GPS data, accelerometer data, vehicle state sensor data, or any other appropriate data. In various embodiments, the environmental conditions comprise excessive light in the driver's eyes, noises, intersection complexity, or any other appropriate environmental conditions. In 502, it is determined whether the environmental conditions indicate an increase in event probability. In various embodiments, it is determined that the environmental conditions indicate an increase in event probability as a result of driver distraction (e.g., environmental factors moving the driver's attention from driving), driver complexity (e.g., environmental factors causing the driver to have to use extra thought to make a driving decision), driver stymieing (e.g., environmental factors causing it to be difficult to think), as a result of a weighted combination of factors, or for any other appropriate reason. In the event it is determined that the environmental conditions do not indicate an increase in event probability, the process ends. In the event it is determined that the environmental conditions indicate an increase in event probability, control passes to 504. In 504, an event detection threshold is adjusted.

Figure 6:
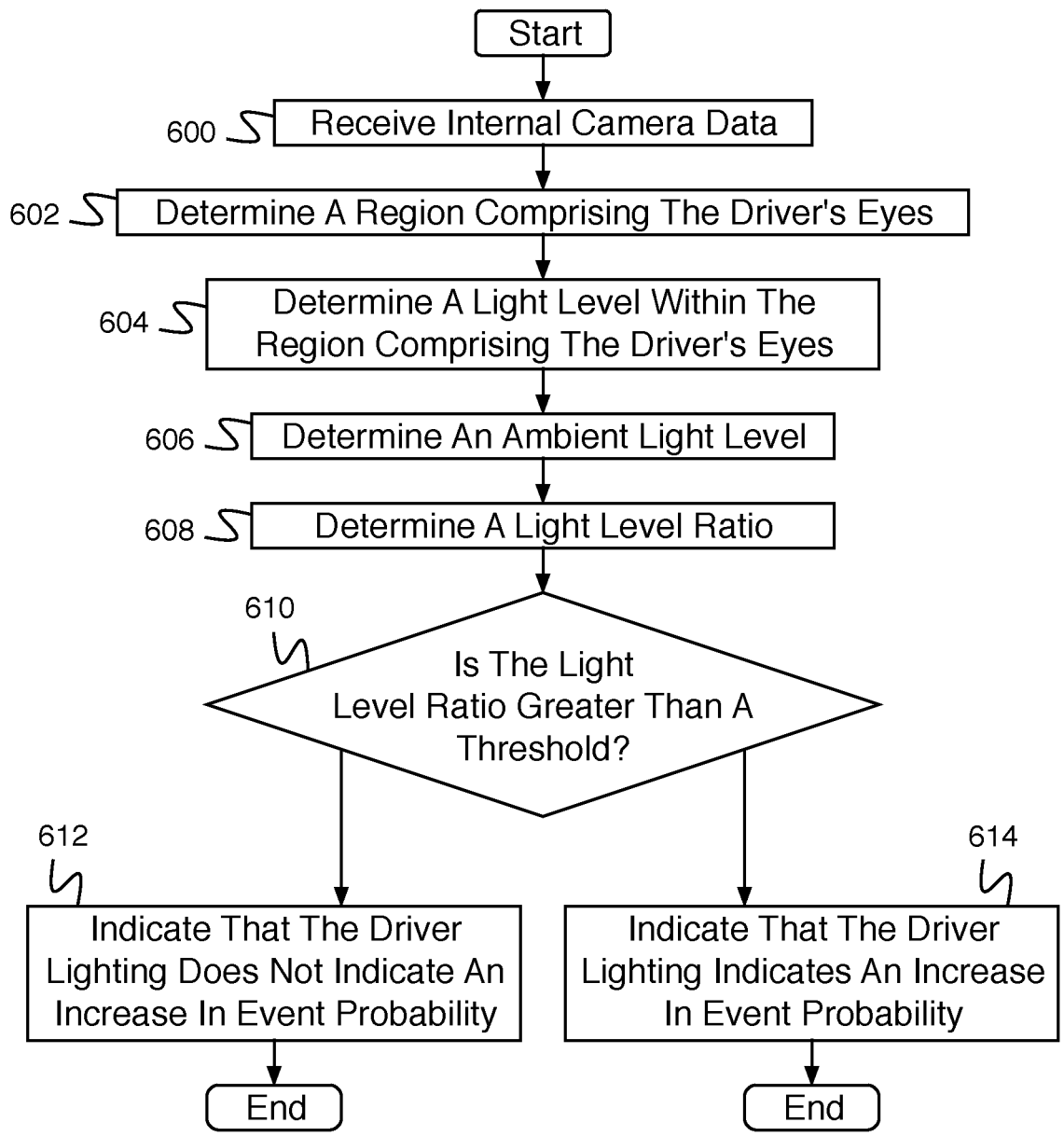
FIG. 6 is a flow diagram illustrating an embodiment of a process for determining whether environmental conditions indicate an increase in event probability.

FIG. 6 is a flow diagram illustrating an embodiment of a process for determining whether environmental conditions indicate an increase in event probability. In some embodiments, the process of FIG. 6 implements 502 of FIG. 5. In some embodiments, the process of FIG. 6 comprises a process for determining whether driver lighting indicates an increase in event probability. In the example shown, in 600, internal camera data is received. In 602, a region (e.g., a region of the internal camera data) comprising the driver's eyes is determined. In 604, a light level within the region comprising the driver's eyes is determined. In 606, an ambient light level is determined (e.g., an average light level outside the region containing the driver's eyes). In 608, a light level ratio is determined. In some embodiments, the light level ratio comprises the ratio of the light level within the region comprising the driver's eyes to the ambient light level. In 610, it is determined whether the light level ratio is greater than a threshold. In the event it is determined that the light level ratio is not greater than a threshold, control passes to 612. In 612, the process indicates that the driver lighting does not indicate an increase in event probability, and the process ends. In the event it is determined in 610 that the light level ratio is greater than a threshold, control passes to 614. In 614, the process indicates that the driver lighting indicates an increase in event probability, and the process ends.

Figure 7:
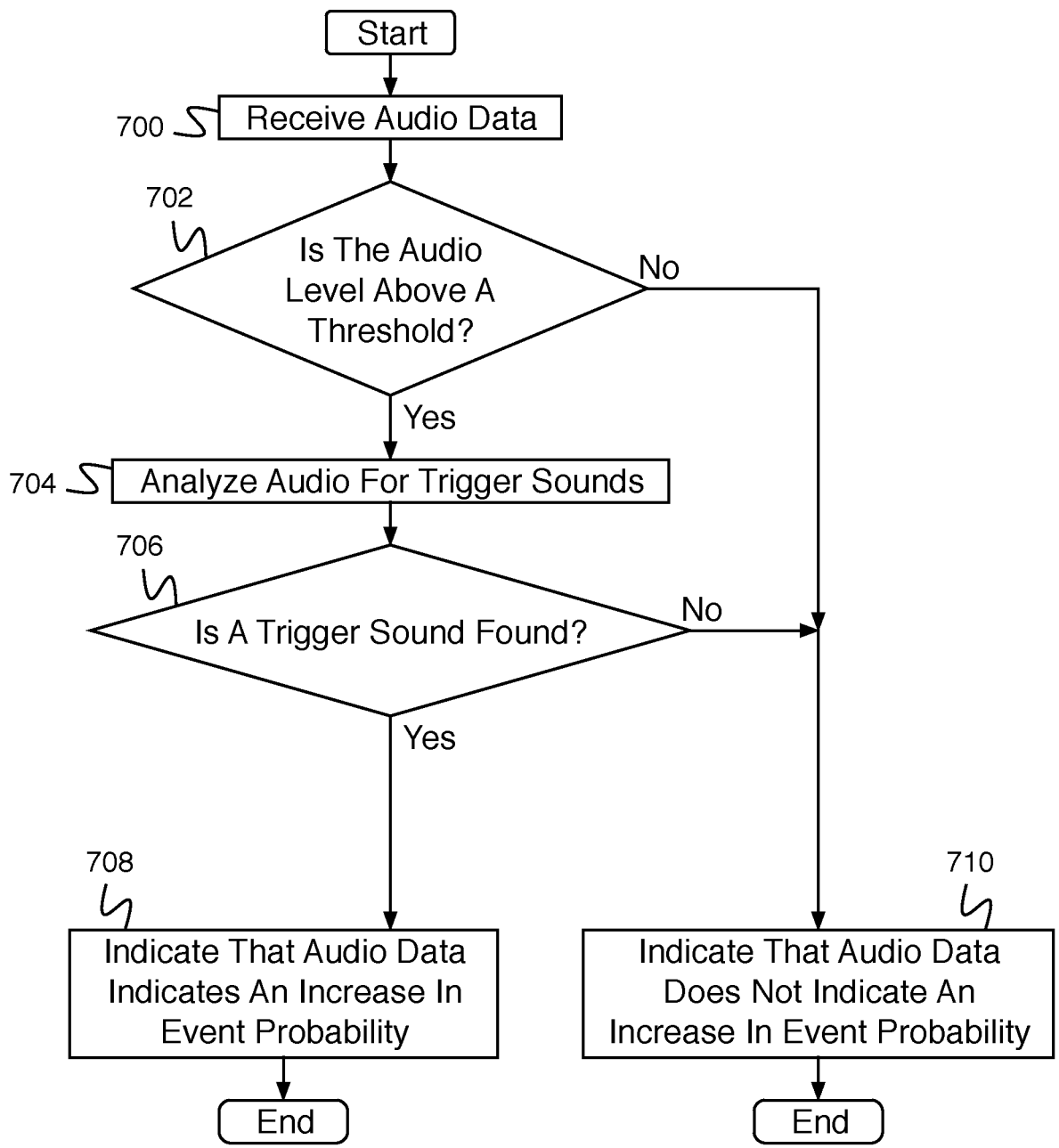
FIG. 7 is a flow diagram illustrating an embodiment of a process for determining whether environmental conditions indicate an increase in event probability.

FIG. 7 is a flow diagram illustrating an embodiment of a process for determining whether environmental conditions indicate an increase in event probability. In some embodiments, the process of FIG. 7 implements 502 of FIG. 5. In some embodiments, the process of FIG. 7 comprises a process for determining whether audio data indicates an increase in event probability. In the example shown, in 700, audio data is received. In some embodiments, audio data comprises audio data from a microphone. In various embodiments, audio data comprises audio data from an internal microphone, an external microphone, a forward facing microphone, a rearward facing microphone, or any other appropriate microphone. In 702, it is determined whether the audio level is above a threshold. In some embodiments, audio data is only determined to indicate an increase in event probability in the event the audio is louder than a threshold loudness. In the event it is determined that the audio level is not above a threshold, control passes to 710. In the event it is determined that the audio level is above a threshold, control passes to 704. In 704, the audio is analyzed for trigger sounds. In various embodiments, trigger sounds comprise shouting, glass breaking, metal bending, metal scraping, sirens, horns honking, or any other appropriate trigger sounds. In 706, it is determined whether a trigger sound is found. In the event it is determined in 706 that a trigger sound is not found, control passes to 710. In the event it is determined in 706 that a trigger sound is found, control passes to 708. In 708, the process indicates that audio data indicates an increase in event probability, and the process ends. In 710, the process indicates that audio data does not indicate an increase in event probability, and the process ends.

Figure 8:
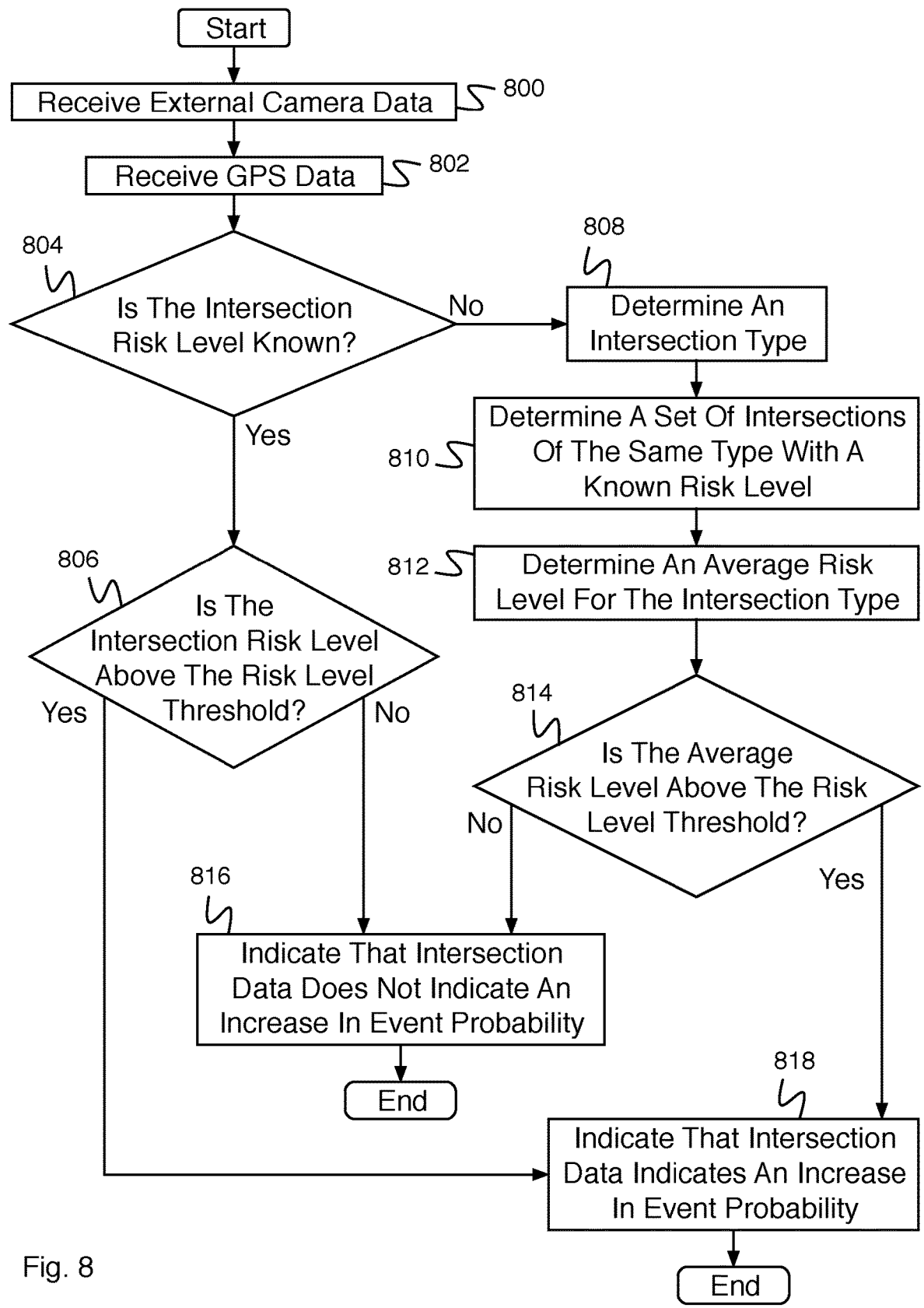
FIG. 8 is a flow diagram illustrating an embodiment of a process for determining whether environmental conditions indicate an increase in event probability.

FIG. 8 is a flow diagram illustrating an embodiment of a process for determining whether environmental conditions indicate an increase in event probability. In some embodiments, the process of FIG. 8 implements 502 of FIG. 5. In some embodiments, the process of FIG. 8 comprises a process for determining whether intersection data indicates an increase in event probability. In some embodiments, intersection data comprises external camera data. In some embodiments, intersection data comprises GPS data. In the example shown, in 800, external camera data is received. In 802, GPS data is received. In 804, it is determined whether the intersection risk level is known. In some embodiments, determining whether the intersection risk level is known comprises looking up the intersection in an intersection risk level database. In some embodiments, GPS data is used to look up an intersection in an intersection risk level database. In the event it is determined that the intersection risk level is known, control passes to 806. In 806, it is determined whether the intersection risk level is above the risk level threshold. In the event it is determined that the intersection risk level is above the risk level threshold, control passes to 818. In the event it is determined that the intersection risk level is not above the risk level threshold, control passes to 816.

In the event it is determined in 804 that the intersection risk level is not known, control passes to 808. In 808, an intersection type is determined. In 810, a set of intersections of the same type (e.g., as the type determined in 808) with a known risk level is determined. In 812, an average risk level for the intersection type is determined. In 814, it is determined whether the average risk level is above the risk level threshold. In the event it is determined that the average risk level is above the risk level threshold, control passes to 818. In the event it is determined that the average risk level is not above the risk level threshold, control passes to 816. In 816, it is indicated that intersection data does not indicate an increase in event probability, and the process ends. In 818, it is indicated that intersection data indicates an increase in event probability.

Figure 9:
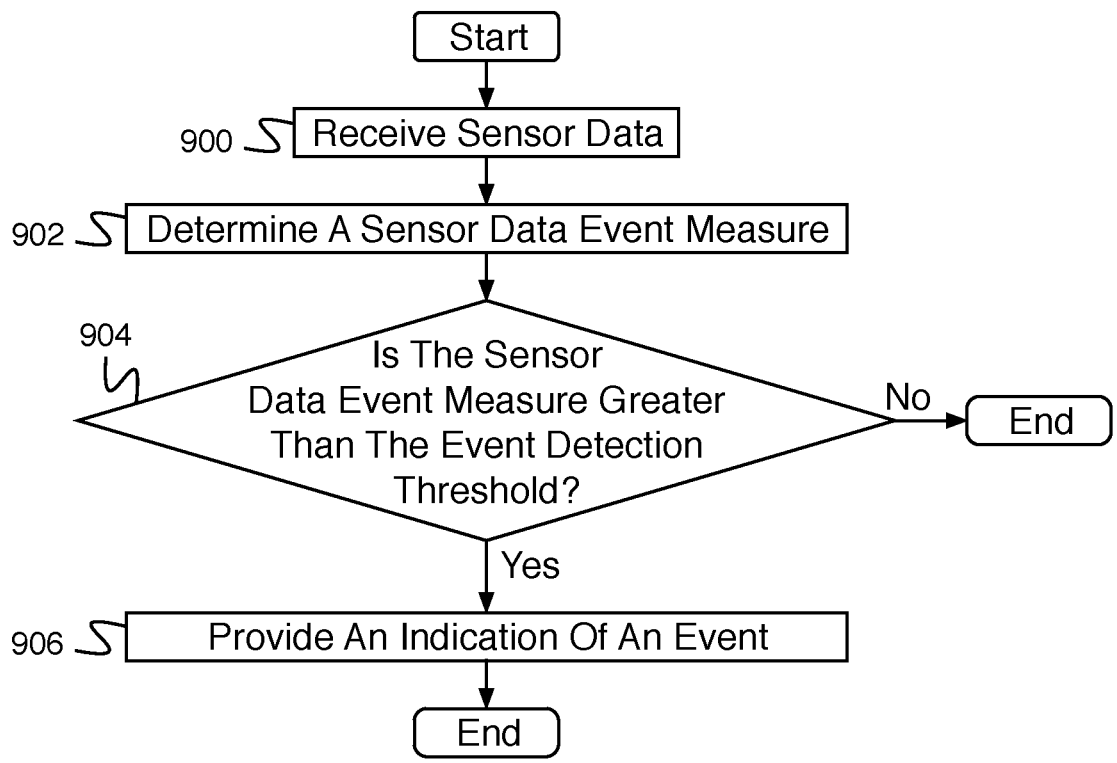
FIG. 9 is a flow diagram illustrating an embodiment of a process for indicating an event.

FIG. 9 is a flow diagram illustrating an embodiment of a process for indicating an event. In some embodiments, the process of FIG. 9 is executed by a vehicle event recorder (e.g., vehicle event recorder 200 of FIG. 2) for indicating an anomalous event. In 900, sensor data is received. In various embodiments, sensor data comprises sensor data received over a communications interface, sensor data received over a sensor data interface, sensor data determined from sensors within the vehicle event recorder, or any other appropriate sensor data. In various embodiments, sensor data comprises accelerometer data, video data, audio data, GPS data, vehicle data, or any other appropriate data. In 902, a sensor data event measure is determined. In various embodiments, determining a sensor data event measure comprises filtering sensor data, normalizing sensor data, linearly processing sensor data, nonlinearly processing sensor data, or determining a sensor data event measure in any other way. In 904, it is determined whether the sensor data event measure is greater than the event detection threshold (e.g., the event detection threshold comprises a threshold on a sensor data level, e.g., the event detection threshold comprises a sensor data threshold). In the event it is determined that the sensor data event measure is not greater than the event detection threshold, the process ends. In the event it is determined that the sensor data event measure is greater than the event detection threshold, control passes to 906. In 906, an indication of an event is provided. In some embodiments, in the event it is determined that the sensor data event measure is greater than the event detection threshold in 904, video capture is triggered (e.g., the event detection threshold comprises a video capture threshold). In some embodiments, in the event it is determined that the sensor data event measure is greater than the event detection threshold in 904, an event is triggered (e.g., the event detection threshold comprises an event trigger threshold). In some embodiments, in the event it is determined that the sensor data event measure is greater than the event detection threshold in 904, event data is transferred (e.g., the event detection threshold comprises an event transfer threshold). In some embodiments, in the event it is determined that the sensor data event measure is greater than the event detection threshold in 904, event data is stored (e.g., the event detection threshold comprises an event storage threshold).

In various embodiments, an event detection threshold comprises one or more of the following: an event detection threshold, a video capture threshold, an event trigger threshold, an event storage threshold, a sensor data threshold, a video data threshold, an accelerometer data threshold, an in cab feedback threshold, or any other appropriate threshold.

In various embodiments, in cab feedback comprises audible warnings (e.g., beeps, voice warnings, etc.) or visual warnings (e.g., flashing LEDs, etc.), or any other appropriate in cab feedback. In some embodiments, when the in cab feedback threshold is met, a beep is issued in cab but a full event data recording is not stored—a smaller data footprint is stored and transferred to a server, although it's minimal, just describing the time of the in cab feedback and less than a page of data on the situation at the time of the in cab feedback.

In various embodiments, an event has associated event data, wherein the event data includes one or more of the following: sensor data, audio data, video data, or any other appropriate data.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for determining risky events, comprising:
   an input interface for receiving sensor data on environmental conditions, wherein the sensor data comprises Global Positioning System (GPS) data, and wherein the environmental conditions comprise intersection complexity; and
   a processor for:
     determining that the environmental conditions indicate an increase in event probability, comprising:
       determining that an intersection is unknown based on the GPS data;
       in response to a determination that the intersection is unknown:
         determining an intersection type of the unknown intersection based on three or more of the following:
           determining a road configuration;
           determining a number of roads present;
           determining a number of lanes present;
           determining a number of directions of traffic;
           determining signs;
           determining lights;

determining pedestrian crosswalks;
determining bicycle lanes; and/or
determining rail tracks;
determining a set of intersections of the same intersection type as the unknown intersection;
determining an average risk level of the set of intersections of the same intersection type as the unknown intersection;
determining that the average risk level is less than a risk threshold level; and
in response to a determination that the average risk level is less than the risk threshold level, determining that the environmental conditions do not indicate an increase in the event probability;
in response to a determination that the environmental conditions indicate the increase in the event probability, adjusting an event detection threshold;
determining that a sensor data event measure is greater than the event detection threshold; and
in response to a determination that the sensor data event measure is greater than the event detection threshold, transferring data related to an event associated with the event detection threshold.

2. The system of claim 1, wherein the sensor data comprises image sensor data.

3. The system of claim 2, wherein the image sensor data comprises still image data.

4. The system of claim 2, wherein the image sensor data comprises video data.

5. The system of claim 1, wherein the sensor data comprises audio sensor data.

6. The system of claim 1, wherein the environmental conditions comprise excessive light in a driver's eyes.

7. The system of claim 1, wherein the environmental conditions comprise noises.

8. The system of claim 1, wherein the environmental conditions indicate the increase in the event probability as a result of driver distraction.

9. The system of claim 1, wherein the environmental conditions indicate the increase in the event probability as a result of driver complexity.

10. The system of claim 1, wherein the environmental conditions indicate the increase in the event probability as a result of driver stymieing.

11. The system of claim 1, wherein the environmental conditions indicate the increase in the event probability as a result of a weighted combination of factors.

12. The system of claim 1, wherein the event detection threshold comprises an event transfer threshold.

13. The system of claim 1, wherein the event detection threshold comprises an event storage threshold.

14. The system of claim 1, wherein the event detection threshold comprises a sensor data threshold.

15. The system of claim 14, wherein the event detection threshold comprises an accelerometer data threshold.

16. The system of claim 14, wherein the event detection threshold comprises a video data threshold.

17. The system of claim 14, wherein the event detection threshold comprises an in-cab feedback threshold.

18. A method for determining risky events, comprising
receiving sensor data on environmental conditions, wherein the sensor data comprises Global Positioning System (GPS) data, and wherein the environmental conditions comprise intersection complexity;
determining, using a processor, that the environmental conditions indicate an increase in event probability, comprising:
determining that an intersection is unknown based on the GPS data;
in response to a determination that the intersection is unknown:
determining an intersection type of the unknown intersection based on three or more of the following:
determining a road configuration;
determining a number of roads present;
determining a number of lanes present;
determining a number of directions of traffic;
determining signs;
determining lights;
determining pedestrian crosswalks;
determining bicycle lanes; and/or
determining rail tracks;
determining a set of intersections of the same intersection type as the unknown intersection;
determining an average risk level of the set of intersections of the same intersection type as the unknown intersection;
determining that the average risk level is less than a risk threshold level; and
in response to a determination that the average risk level is less than the risk threshold level, determining that the environmental conditions do not indicate an increase in the event probability;
in response to a determination that the environmental conditions indicate the increase in the event probability, adjusting an event detection threshold;
determining that a sensor data event measure is greater than the event detection threshold; and
in response to a determination that the sensor data event measure is greater than the event detection threshold, transferring data related to an event associated with the event detection threshold.

19. A computer program product for determining risky events, the computer program product being embodied in a non-transitory computer readable storage medium and comprising computer instructions for:
receiving sensor data on environmental conditions, wherein the sensor data comprises Global Positioning System (GPS) data, and wherein the environmental conditions comprise intersection complexity;
determining that the environmental conditions indicate an increase in event probability, comprising:
determining that an intersection is unknown based on the GPS data;
in response to a determination that the intersection is unknown:
determining an intersection type of the unknown intersection based on three or more of the following:
determining a road configuration;
determining a number of roads present;
determining a number of lanes present;
determining a number of directions of traffic;
determining signs;
determining lights;
determining pedestrian crosswalks;
determining bicycle lanes; and/or
determining rail tracks;
determining a set of intersections of the same intersection type as the unknown intersection;
determining an average risk level of the set of intersections of the same intersection type as the unknown intersection;

determining that the average risk level is less than a risk threshold level; and in response to a determination that the average risk level is less than the risk threshold level, determining that the environmental conditions do not indicate an increase in the event probability;

in response to a determination that the environmental conditions indicate the increase in the event probability, adjusting an event detection threshold;

determining that a sensor data event measure is greater than the event detection threshold; and in response to a determination that the sensor data event measure is greater than the event detection threshold, transferring data related to an event associated with the event detection threshold.

* * * * *